US011715955B2

(12) United States Patent
Nielsen et al.

(10) Patent No.: US 11,715,955 B2
(45) Date of Patent: Aug. 1, 2023

(54) VIRTUAL SYNCHRONOUS GENERATOR WITH ACTIVE DAMPING

(71) Applicant: VESTAS WIND SYSTEMS A/S, Aarhus N (DK)

(72) Inventors: John Godsk Nielsen, Hornslet (DK); Torsten Lund, Fredericia (DK); Esmaeil Ebrahimzadehveshareh, København (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/419,251

(22) PCT Filed: Dec. 16, 2019

(86) PCT No.: PCT/DK2019/050390
§ 371 (c)(1),
(2) Date: Jun. 28, 2021

(87) PCT Pub. No.: WO2020/135904
PCT Pub. Date: Jul. 2, 2020

(65) Prior Publication Data
US 2022/0069580 A1    Mar. 3, 2022

(51) Int. Cl.
*F03D 7/00* (2006.01)
*H02J 3/24* (2006.01)
*F03D 7/02* (2006.01)
*H02J 3/38* (2006.01)

(52) U.S. Cl.
CPC .............. *H02J 3/24* (2013.01); *F03D 7/0284* (2013.01); *H02J 3/381* (2013.01); *H02J 2300/28* (2020.01)

(58) Field of Classification Search
CPC ...... H02J 3/16; H02J 3/24; H02J 3/381; H02J 2300/28; H02K 7/183; F03D 7/0284; F03D 9/25; F05B 2220/706; F05B 2270/335; Y02E 10/76; Y02E 40/30
See application file for complete search history.

(56) References Cited

U.S. PATENT DOCUMENTS

2018/0145582 A1* 5/2018 Shuai ...................... H02M 1/32

FOREIGN PATENT DOCUMENTS

| CN | 102882383 A | * | 1/2013 |
| CN | 106208159 a | | 12/2016 |

(Continued)

OTHER PUBLICATIONS

Li et al., "New Control Schemes of Output Power Decoupling Based on Synchronverter," 2018 21st International Conference on Electrical Machines and Systems (ICEMS), Oct. 7-10, 2018, 6 pages (D1).

(Continued)

*Primary Examiner* — Julio C. Gonzalez
(74) *Attorney, Agent, or Firm* — Patterson + Sheridan, LLP

(57) ABSTRACT

The invention relates to a method for controlling a power generating unit such as a wind turbine which is configured as a virtual synchronous machine. Capacitor voltage signals obtained from voltage measurements of output capacitors are filtered in order to reduce a magnitude of an impedance peak and/or shift the impedance peak where the impedance peak is present in an impedance characteristic of the output of the power generating unit. Filter compensated voltage signals obtained from the output capacitors are combined with a voltage magnitude reference to obtain filtered capacitor voltage signals used for controlling the line side converter and thereby affect the impedance peak in a desired way.

16 Claims, 6 Drawing Sheets

(56) References Cited

FOREIGN PATENT DOCUMENTS

| | | | |
|---|---|---|---|
| CN | 106849184 A | 6/2017 | |
| CN | 108390396 A | 8/2018 | |
| CN | 108879722 A * | 11/2018 | ............... H02J 3/24 |
| EP | 2529462 A2 | 12/2012 | |
| WO | 2011092193 A2 | 8/2011 | |
| WO | 2020135904 A1 | 7/2020 | |

OTHER PUBLICATIONS

Ndirangu J.G., Nderu J.N, Muhia and Maina C.M, "Power Quality Challenges and Mitigation Measures in Grid Integration of Wind Energy Conversion Systems," 978-1-5386-366-5/18, IEEE, 6 pages (D2).
Xiaodong Liang, "Emerging Power Quality Challenges Due to Integration of Renewable Energy Sources," IEEE Transactions of Industry Applications, vol. 53., No. 2, Mar./Apr. 2017, 12 pages (D3).
Olve Mo, Salvatore D'Arco and Jon Are Suul, "Evaluation of Virtual Synchronous Machines With Dynamic or Quasi-Stationary Machines Models," IEEE Transactions on Industrial Electronics, vol. 64, No. 7, Jul. 2017, 12 pages (D5).
Danish Patent and Trademark Office First Technical Examination for Application No. PA 2018 70871 dated Jun. 19, 2019.
PCT Notification of Transmittal of the International Search Report and the Written Opinion of the International Searching Authority, or the Declaration for Application No. PCT/DK2019/050390 dated Dec. 3, 2020.

* cited by examiner $$Z_{pp} = \frac{u_{cap}}{i} \approx \frac{Ls}{LCs^2 + 1 - G_{ff}G_d} \qquad G_d \approx \frac{1 - 0.5T_s s}{1 + 0.5T_s s}$$

$$G_{ff} = K\frac{s}{1+Ts} \quad or \quad G_{ff} = K\frac{1+T_1 s}{1+T_2 s}$$

VIRTUAL SYNCHRONOUS GENERATOR WITH ACTIVE DAMPING

FIELD OF THE INVENTION

The invention relates to control of power generating units, particularly renewable power generating units such as wind turbines, and particularly control of power generating units configured to exhibit a virtual synchronous generator response.

BACKGROUND OF THE INVENTION

In order to allow a much higher penetration of renewable energy sources such as wind turbines into the electrical grid, some countries propose requirements to equip the power converters with grid-forming properties similar to conventional synchronous generators. These requirements can be address by configuring the renewable power generating units as virtual synchronous machines VSM.

Some grid operators prefer that the virtual synchronous machines have an impedance spectrum which resembles that of a voltage source behind a pure inductance. Because most inverters comprise a capacitive harmonic filter, there will be a resonance point where where the resulting impedance gets extremely high, and the damping is low.

Accordingly, it is a problem that virtual synchronous machines exhibit impedance characteristics which may deviate from impedance characteristics requested by the grid operators. Hence, an implementation of the virtual synchronous machine which addresses these problems is needed.

SUMMARY OF THE INVENTION

It is an object of the invention to improve control of power generating units such as wind turbines to alleviate one or more of the above mentioned problems, and therefore to provide a method which provides improved control methods of virtual synchronous machines.

In a first aspect of the invention, a method for controlling a power generating unit is presented where the power generating unit comprises a power source, a machine side converter, a line side converter, a DC link electrically connected to an output of the machine side converter and an input of the grid side converter, and filter inductors and filter capacitors arranged at the output of the power generating unit, the method comprises
  obtaining capacitor voltage signals in a measurement frame by measuring capacitor voltages of one or more of the filter capacitors,
  determining a virtual synchronous machine rotational speed and/or a synchronous machine angle, where the derivative of the synchronous machine rotational speed is indicative of a deviation between a power reference for a desired power output of the power generating unit and a grid power supplied by the power generating unit to the output combined with a damping power,
  providing a voltage magnitude reference for the desired reactive power to be generated by the line side converter,
  optionally, transforming the capacitor voltage signals from the measurement frame into a target frame to generate transformed capacitor voltage signals,
  filtering the capacitor voltage signals, or the transformed capacitor voltage signals, with a compensation filter into filtered capacitor voltage signals, where the compensation filter is designed to reduce a magnitude of an impedance peak and/or shift the impedance peak, where the impedance peak is present in an impedance characteristic of the output of the power generating unit, and
  determining a filter compensated voltage reference by combining the voltage magnitude reference, or a transformation thereof, with the filtered capacitor voltage signals.

Advantageously, by feeding forward the measured voltages of the filter capacitors of the capacitive harmonic filter and filtering the voltages with the compensation filter before combining the filtered voltage signal with the voltage magnitude reference for the desired reactive power, the impedance peak is affected so that the undesired resonance effect of the filter capacitors, at least in frequency range of interest, is eliminated or reduced.

The transforming of the capacitor voltage signals from the measurement frame into a target frame to generate transformed capacitor voltage signals is an optional transformation since implementations where signals obtained in the measurement frame are maintained in the measurement frame without further transformations.

According to an embodiment the method comprises controlling the power output from the power generating unit by,
  controlling the generation of reactive power generation from the line side converter based on the filter compensated voltage reference, or a transformation thereof, and
  controlling the generation of active power generation from the line side converter based on the synchronous machine angle, or a transformation thereof.

According to an embodiment the compensation filter or a series connected filter is further designed to decouple the voltage magnitude reference from the filtered capacitor voltage signals at a fundamental frequency.

Advantageously, the capacitor voltage signals are filtered to remove signal content at the fundamental frequency, e.g. the grid frequency or zero Hertz frequency dependent on rotation transformations used in the processing of the capacitor voltage signals.

According to an embodiment the virtual synchronous machine rotational speed is determined based on a combination of a feedback of a damping power, the power reference, the grid power and an inertial integration model, where the synchronous machine angle is determined based on an integration of the synchronous machine rotational speed, and where the damping power is determined based on the virtual synchronous machine rotational speed.

According to an embodiment the determination of the damping power based on the virtual synchronous machine rotational speed comprises high-pass filtering the synchronous machine rotational speed and determining the damping power based on the high-pass filtered signal.

According to an embodiment the method comprises
  obtaining a network voltage at a connection point of the output of the power generating unit,
  determining a rotational speed of the grid based on the network voltage, and
  determining the damping power based on the virtual synchronous machine rotational speed and the rotational speed of the grid.

According to an embodiment the compensation filter comprises a lead-lag filter or a high-pass filter.

The compensation filter may be designed to limit the resonance caused by the harmonic filter capacitors by approximate pole cancelling methods.

According to an embodiment the voltage magnitude reference is defined in a DQ frame, i.e. a direct quadrature frame.

According to an embodiment the method comprises transforming the voltage magnitude reference in the DQ frame to a non-rotating target frame, and the filter compensated voltage reference is determined by combining said transformed voltage reference with the filtered capacitor voltage signals.

According to an embodiment the filter compensated voltage reference is determined by combining the voltage magnitude reference—or a derived voltage reference derived from the voltage magnitude reference—with the filtered capacitor voltage signals.

According to an embodiment the capacitor voltage signals are transformed from the measurement frame into the target frame to generate the transformed capacitor voltage signals.

According to an embodiment the method comprises transforming the filter compensated voltage reference from the target frame to the measurement frame.

According to an embodiment the power generating unit is a wind turbine.

A second aspect of the invention relates to a control system for controlling a power generating unit, the power generating unit comprises a power source, a machine side converter, a line side converter, a DC link electrically connected to an output of the machine side converter and an input of the grid side converter, and filter inductors and filter capacitors arranged at the output of the power generating unit, the control system is arranged to

- obtaining capacitor voltage signals in a measurement frame by measuring capacitor voltages of one or more of the filter capacitors,
- determining a virtual synchronous machine rotational speed and/or a synchronous machine angle, where the derivative of the synchronous machine rotational speed is indicative of a deviation between a power reference for a desired power output of the power generating unit and a grid power supplied by the power generating unit to the output combined with a damping power,
- providing a voltage magnitude reference for the desired reactive power to be generated by the line side converter,
- optionally, transforming the capacitor voltage signals from the measurement frame into a target frame to generate transformed capacitor voltage signals,
- filtering the capacitor voltage signals, or the transformed capacitor voltage signals, with a compensation filter into filtered capacitor voltage signals, where the compensation filter is designed to reduce a magnitude of an impedance peak and/or shift the impedance peak, where the impedance peak is present in an impedance characteristic of the output of the power generating unit, and
- determining a filter compensated voltage reference by combining the voltage magnitude reference, or a transformation thereof, with the filtered capacitor voltage signals.

A third aspect of the invention relates to a power generating unit comprising a control system according to the second aspect.

A fourth aspect of the invention relates to a computer program product comprising software code adapted to control a wind turbine when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
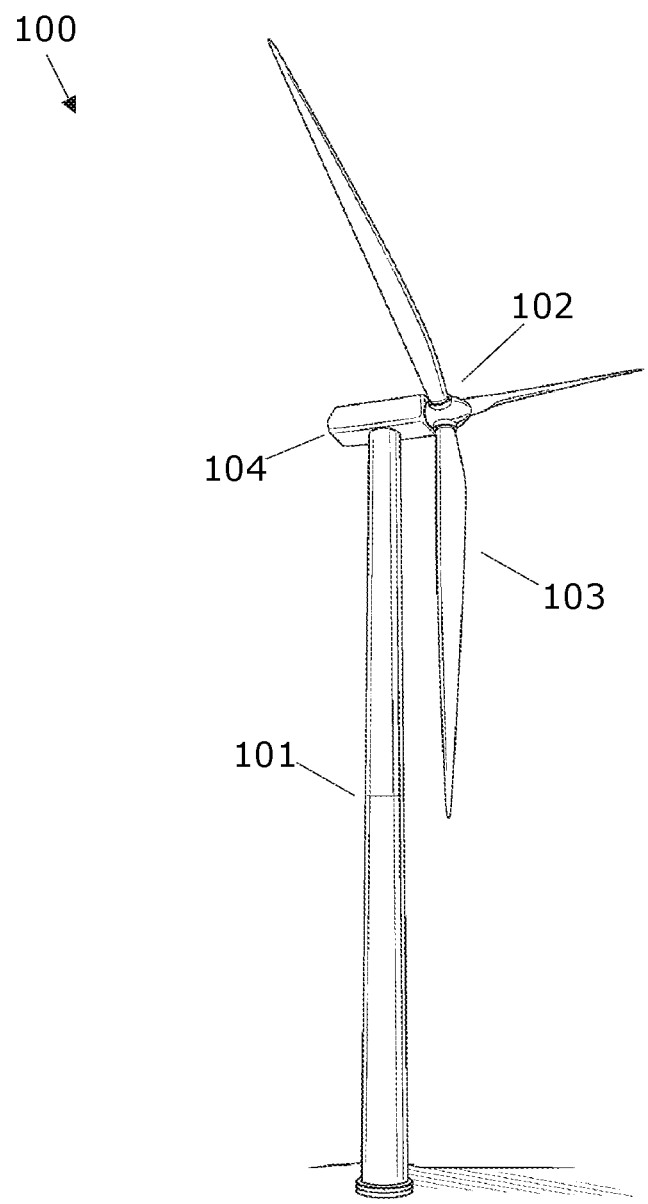
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid.

Figure 2A:
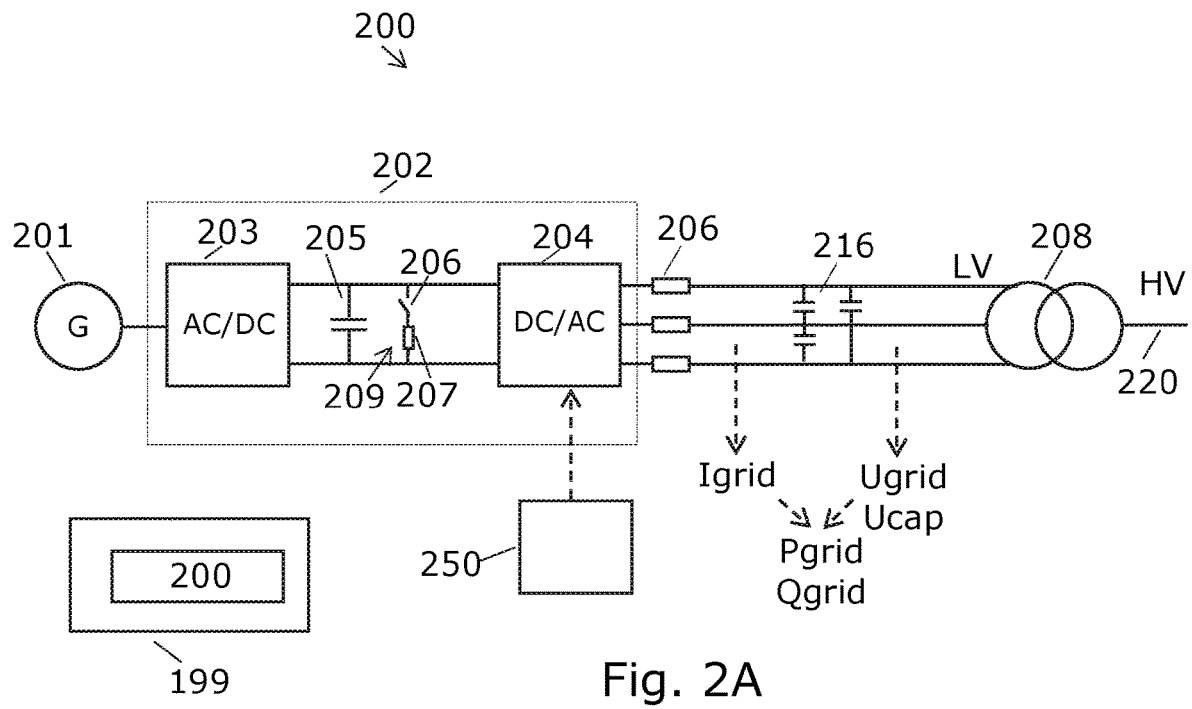
FIG. 2A shows an example of a power system of a wind turbine or a power generating unit.

FIG. 2A shows an example of a power system 200 of a wind turbine 100 according to an embodiment. The power system comprises a generator or power source 201 and a power converter 202. The power converter 202 comprises a machine side converter 203, a line side converter 204, a DC-link 205 and a resistor 207 connected with a controllable switch 206. The resistor and switch forms a power dissipation device, also known as a chopper 209, for dissipating active power. The DC-link 205 comprises on or more DC-link capacitors which are charged by the DC output current from the generator side converter 203 and which supplies DC power to the line side converter 204. The output AC current from the line side converter 204 is supplied via output inductors 206 and possibly via a wind turbine transformer 208 to the power line 220. Harmonic filter capacitors 216 arranged between the conductors of the output, together with the inductors 206, forms a harmonic filter which converts the square wave voltage signals from the line side converter 204 to voltage sinusoidal signals.

Since the power system 200 also applies to other power generating units 199 configured with a full scale power converter 202, the examples and embodiments of the present invention applies equally to other power generating units such as renewable power generating units, e.g. solar power units or photovoltaic power generating units. That is, the generator or power source 201 may be embodied by solar power sources such as photovoltaic power sources, wind turbine generators or other power sources or generators. It follows that the power generating unit 199 which comprises the power system 200 may be a wind turbine, a solar power plant or unit or other power units such as renewable power generating units.

The power line 220 may be a medium voltage power bus which receives power from other wind turbines 100. The power line 220 may be connected with a high voltage network, e.g. via further transformers. Thus, the power line 220 and one or more power systems 200 of corresponding wind turbines constitutes a wind power plant or park arranged to supply power to a utility grid for distribution of electrical power.

The power converter 202 may be full-scale converter configured according to different principles including forced-commutated and line-commutated converters.

The power system 200 is principally illustrated and therefore does not explicitly reveal that the system may be a three phase system. However, principles of the described embodiments apply both to single and multi-phase systems.

The line side converter 204 uses some variant of pulse width modulation (PWM) for converting the DC power into AC power. The control system 250 is used for controlling the modulation of the line side converter 204 and for controlling the active power P and the reactive power Q generated by the line side converter 204.

FIG. 2A shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining the active power Pgrid from grid voltage Ugrid and grid current Igrid. The reactive power Qgrid may similarly be determined from Ugrid and Igrid. Alternatively, the grid voltage Ugrid may be measured on the high voltage HV side of the transformer and corrected based on the turns ratio of the transformer, or the internal voltage magnitude reference Vqref is used instead of the measured voltage Ugrid. Thus, in an alternative, internal voltage magnitude reference such as Vqref, Vdqref or Vαβref may be used for determining Pgrid and consequently the synchronous machine angle θVSM. Thus, the grid current Igrid supplied to the grid can also be measured.

Figure 2B:
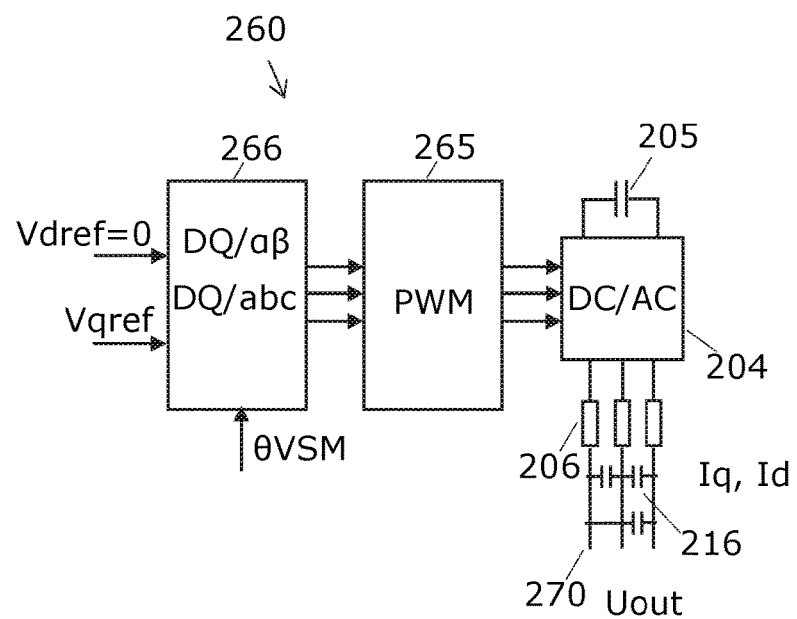
FIG. 2B shows control components arranged for controlling the generation of active power and reactive power supplied to the grid at the power output of the wind turbine or power generating unit.

FIG. 2B shows an example of control components 260 arranged for controlling the generation of active power Pgrid and reactive power Qgrid supplied to the grid at the power output 270 from the wind turbine. That is, the control components 260 may be arranged for controlling the output active power Pgrid and the output voltage magnitude at the low voltage side LV, alternatively for controlling the output active power P and the output reactive power Qgrid at the low voltage side LV. The control components 260 may form part of the control system 250. Alternatively, the control components 260 receive control signals from the control system 250.

References for the active and reactive power may be received from a power plant controller, PPC, or a grid operator, TSO, or determined from active and reactive power references, e.g. from the grid operator.

The active power, Pgrid, is controlled via the virtual synchronous machine angle θVSM. In short the synchronous machine angle acceleration indicates a difference between a power reference Pref for a desired power output of the wind turbine and a grid power Pgrid supplied by the wind turbine to a power grid. Examples for determining the synchronous machine angle θVSM is given elsewhere.

The synchronous machine angle θVSM may be used to transform the signals from the rotating DQ frame into a non-rotating frame such as the αβ or abc frame, or viseversa. Based on the synchronous machine angle θVSM and voltage magnitude reference Vqref, control signals for the desired active power and reactive power are determined.

Thus, the synchronous machine angle θVSM may be defined in a rotating DQ frame defined by the angular position θVSM. Based on the synchronous machine angle θVSM, control signals, i.e. the angle of the modulation voltage signals for the pulse-width-modulator PWM, 265 are determined and transformed into a non-rotating frame such as the αβ or abc frame. The modulation voltage reference signal controls the active and reactive power Pgrid and Qgrid.

The frame conversion unit 266 transforms the control signal from the DQ frame into the αβ or abc frame and determines the sinusoidal voltage references for the PWM 265. The frame converted output signals from the control unit 266 unit are converted by the pulse-width-modulator PWM, 265 into a modulation signal for the grid side converter 204 in order to generate the desired active power and reactive power and/or voltage magnitude.

The reactive power Qgrid to be generated by the line side converter 204 can be controlled based on a voltage magnitude reference Vqref.

The voltage magnitude reference Vqref may be defined in the DQ frame which rotates with the rotational speed ωVSM of the virtual synchronous machine, i.e. in steady state condition the fundamental frequency such as 50 Hz of the AC grid voltage. The voltage magnitude reference Vqref, or a modification thereof as described in the following, may be converted from the DQ frame to the αβ or abc frame and outputted from the control unit 266 as a control signal to the pulse-width-modulator PWM, 265 which determines the modulation signal for the grid side converter 204.

Figure 3A:
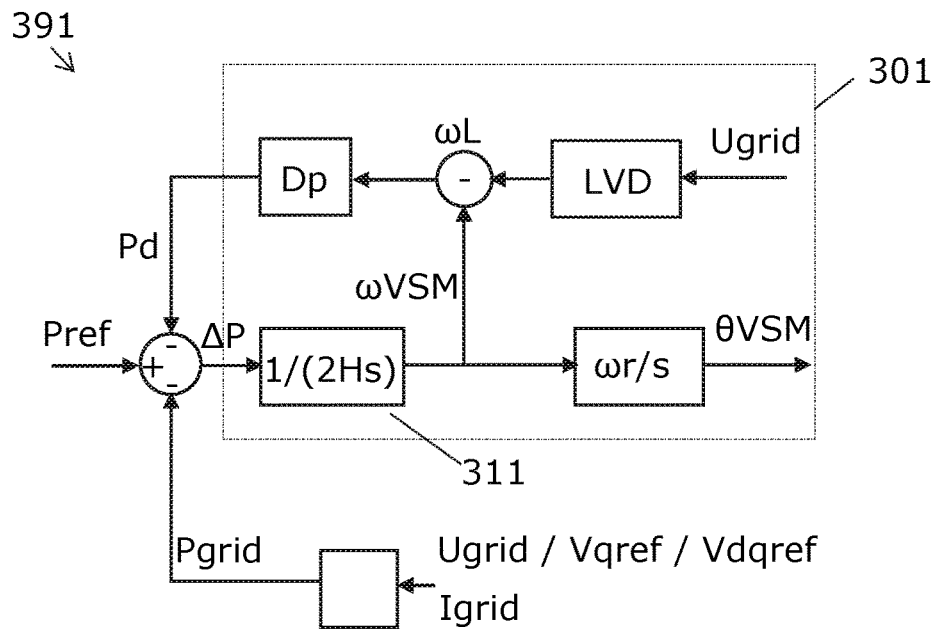
FIG. 3A-B show examples of control systems for determining the synchronous machine angle.
Figure 3B:
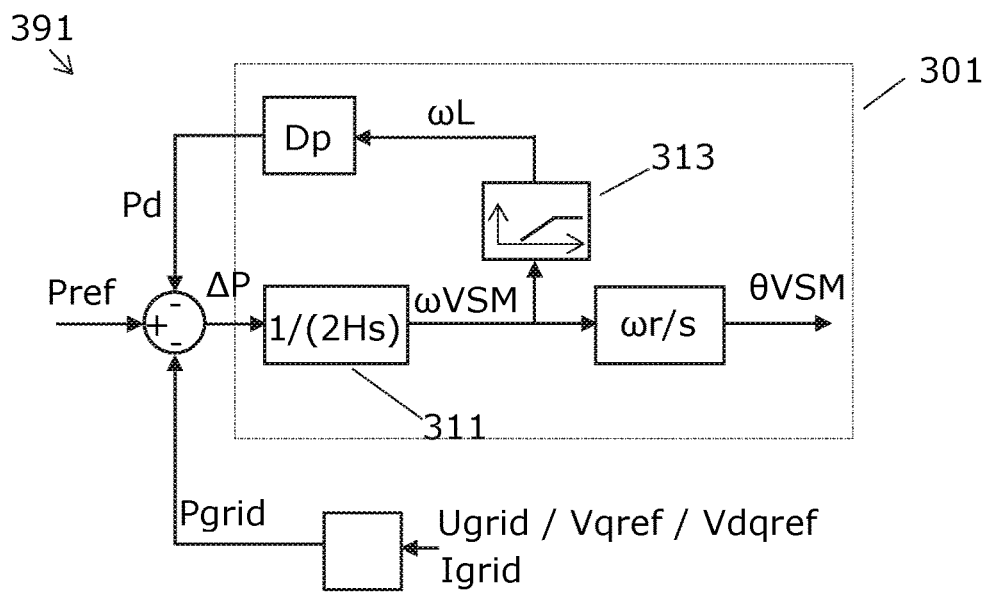

FIG. 3A and FIG. 3B show examples of control systems 391 for determining the synchronous machine angle θVSM.

The synchronous machine angle θVSM is determined based on a virtual synchronous machine control concept which aims at generating a power response which corresponds to the power response from a real synchronous generator, including the inertia of the synchronous generator.

Under steady state conditions, the value of the power error ΔP is zero. In response to grid voltage fluctuations, e.g. reflected in the measured Ugrid, or in response to the power reference changes Pref, the power error value ΔP becomes non-zero, which causes the angle θVSM is increased or decreased to reduce the power error ΔP. For example, during a Low Voltage Ride Through (LVRT) event or under voltage ride through (UVRT) the power error value ΔP becomes positive and synchronous machine speed ωVSM will increase.

Thus, in response to grid voltage fluctuations, e.g. reflected in the measured Ugrid and Pgrid, the synthetic inertial response value becomes non-zero, which causes the virtual machine to either accelerate or decelerate to reach a new equilibrium condition. The new equilibrium is reached when the measured grid power Pgrid is again following Pref.

The virtual synchronous machine control concept is utilized on the line side converter 204 using a swing equation to calculate θVSM.

FIG. 3A shows an example of an implementation of the virtual synchronous model 301. The virtual synchronous model 301 includes a closed loop where the virtual synchronous machine rotational speed ωVSM is determined based on a combination a feedback of a damping power Pd, a power reference Pref for the desired active power output of the wind turbine, the active grid power Pgrid supplied by the wind turbine to the grid via the power line 220 and an inertial integration model 311. The inertial integration model 311 is implemented as 1/(2Hs) where H is the inertia time constant and 1/s is the integration in s-domain. Accordingly, the combination of powers Pref−Pd−Pgrid=ΔP is used as input for the inertial integration model 311.

Since the derivative of the synchronous machine rotational speed ωVSM is proportional to the deviation between the power reference Pref and the grid power Pgrid, the integration of the difference ΔP gives the synchronous machine rotational speed ωVSM.

The grid power Pgrid can be determined based on the measured grid voltage Ugrid or internal voltage references such as the magnitude reference Vqref, or transformations thereof such as Vαβref or Vdqref, and the measured grid current Igrid.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

FIG. 3B shows an alternative virtual synchronous model 301 which is not based on a measured grid voltage Ugrid, but instead the rotational speed of the grid ωL is determined based on a high-pass filtering of the determined synchronous machine rotational speed ωVSM, i.e. by determining the rotational speed of the grid ωL as the output of the high-pass filter 313 which is arranged to filter the inputted synchronous machine rotational speed ωVSM.

Thus, the alternative virtual synchronous model 301 is not based on a measured grid voltage Ugrid, but the damping part, e.g. the damping power Pd, is determined based on a high-pass filtering 313 of the synchronous machine rotational speed ωVSM.

In general, the virtual synchronous model 301 determines the angle of the virtual machine θVSM based on the combination of powers Pref, Pd, Pgrid, the inertial integration model 311, e.g. implemented as 1/(2Hs) and a feedback of the damping power Pd determined based on ωVSM and an integration of ωVSM, In other words, the synchronous machine rotational speed ωNSM and the synchronous machine angle θVSM are determined so that they are indicative of a integrated deviation between a power reference Pref for a desired power output of the wind turbine and a grid power Pgrid supplied by the wind turbine to the output.

The control systems 391 are implementable based on power values Pref, Pd, Pgrid but may equivalently be implemented based on corresponding torque values Tref, Td, Tgrid based on the relationship where power equals torque times rotation frequency, e.g. the synchronous machine rotational speed ωVSM.

Due to certain grid code requirements, or since some TSOs prefer that the virtual synchronous machine has an impedance spectrum which resembles that of a voltage source behind a pure inductance, embodiments of the present invention proposes solutions which modifies the impedance spectrum, Due to the capacitive harmonic filter formed by harmonic filter capacitors 216 and inductors 206, there will be a resonance point where the resulting impedance gets extremely high, and the damping is low.

Embodiments of the present inventions addresses this problem by feeding forward the measured filter voltage, i.e. measured voltages over the harmonic filter capacitors 216, to eliminate or reduce the effect of the capacitor in the frequency range under consideration.

Figure 4:
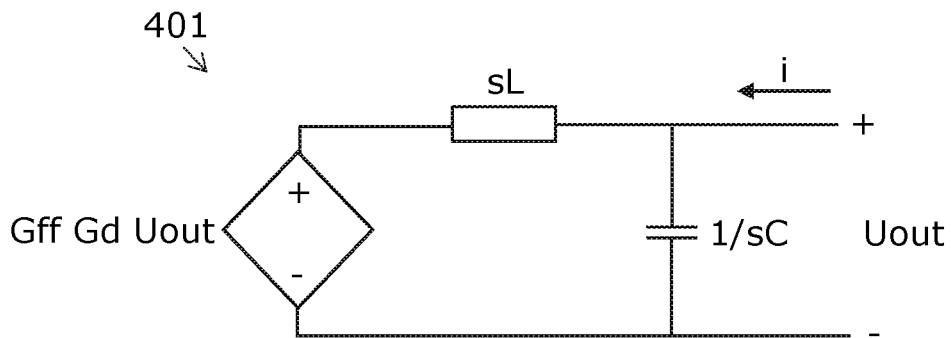
FIG. 4 illustrates an equivalence diagram of the output of the virtual synchronous machine.

FIG. 4 illustrates an equivalence diagram 401 of the output of the virtual synchronous machine, i.e. the output of the line side converter 204 seen from the power output location 270, i.e. between the filter capacitors 216 and the transformer 208, towards the converter 204. L is the equivalent inductance of the inductors 206, C is the equivalent capacitance of the filter capacitors 216 and bout is the output voltage. Gd is the delay model of the pulse-width-modulator 265 and digital control. Gff is a compensation filter designed to reduce an amplitude of an impedance peak 511 and/or shift the impedance peak, where the impedance peak is present in the impedance characteristic Zpp of the equivalence diagram 401. Equations for Zpp and the transfer function of Gd is shown in FIG. 4A Without using a grid voltage feedforward, i.e. with Gff=0, the pole of the transfer function Zpp results in the impedance peak 511 illustrated in FIG. 5. By adding a grid voltage feedforward Gff to the voltage magnitude reference Vqref (or transformations thereof, ie. Vdqref or Vαβref) of the virtual synchronous machine through the compensation filter Gff in series with a series connected filter Gff2 the impact of the impedance peak 511 can be reduced.

Figure 6A:
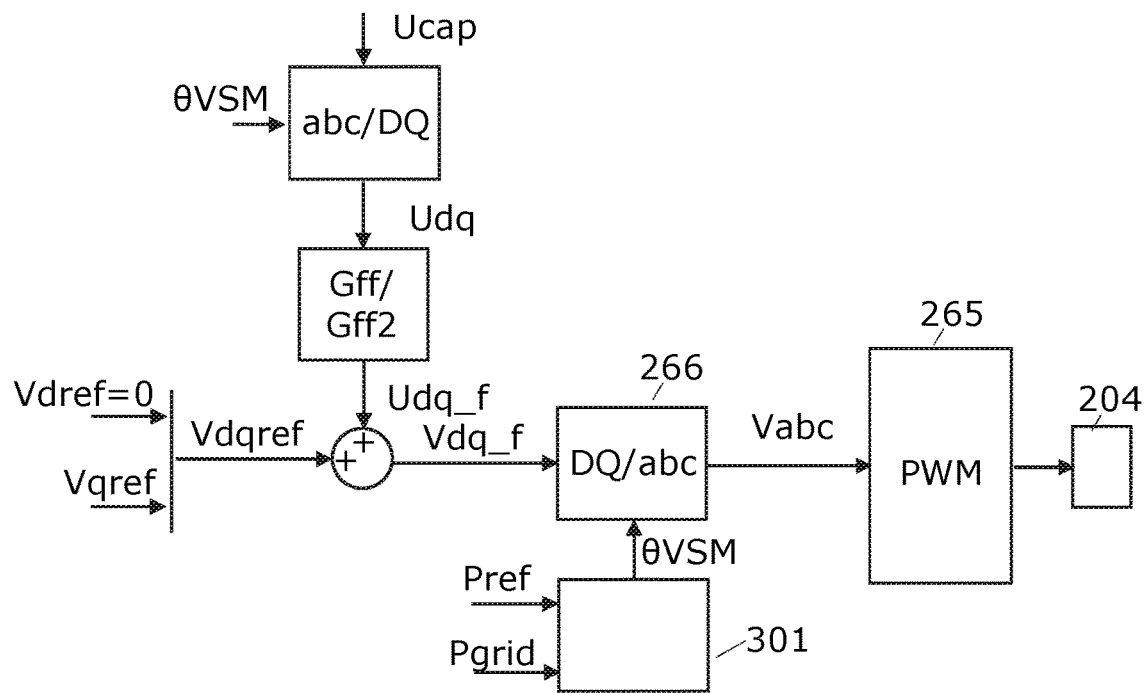
FIG. 6A-B show examples of implementations of the compensation filter Gff.

FIG. 6A shows an example of the implementation of the compensation filter Gff.

One or more voltage signals Ucap are obtained from measurements of the voltages across the respective filter capacitors C, 216. The capacitor voltages Ucap may be equivalent or identical with the grid voltages Ugrid obtained at the low voltage side as described in connection with FIG. 2A. Thus, Ucap may be replaced by Ugrid.

The voltage signals Ucap are obtained in the stationary measurement frame abc. For example, three voltage signals Ucap, one for each of the three phases may be obtained.

In this example, the voltages Ucap are transformed from the measurement frame to the DQ frame which rotates with the virtual synchronous angular frequency. The abc/DQ transformation is performed based on the virtual synchronous machine angle θVSM. The transformed capacitor voltage signals Ucap are referred to as transformed capacitor voltage signals Udq.

The virtual synchronous machine angle θVSM is used for the frame conversion 266 from the DQ frame into the abc frame and provided as a control signal to the pulse-width-modulator PWM, 265 in order to generate the active power P based on θVSM as described in connection with FIG. 2A. The virtual synchronous machine angle θVSM is determined as described in connection with FIG. 3A-B.

The transformed capacitor voltage signals Udq are filtered with the compensation filter Gff into filtered capacitor voltage signals Udq_f so as to reduce the magnitude of the impedance peak 511 and/or shift the impedance peak 511, e.g. shift the impedance peak 511 to a lower frequency.

Since the transformed capacitor voltage signals Udq are represented as DC signals, a high pass filter Gff2 is arranged in series with the compensation filter Gff or a high pass filter is included in the compensation filter Gff to decouple the voltage reference Vdqref from the filtered capacitor voltage signals Udq_f at the fundamental frequency, e.g. the 50 Hz grid frequency.

The voltage reference Vdqref is the voltage reference in the DQ frame generated based on the voltage magnitude reference Vqref.

The filtered capacitor voltage signals Udq_f are combined, e.g. added, to the voltage reference Vdqref to generate the filter compensated voltage reference Vdq_f for the desired reactive and active power to be generated by the line side converter 204.

The filter compensated voltage reference Vdq_f is transformed from the DQ frame to the measurement frame abc similarly to the control signal derived from the synchronous machine angle θVSM.

The generation of reactive power Q and active power P are controlled based on the filter compensated voltage reference Vdq_f and the synchronous machine angle θVSM.

Figure 6B:
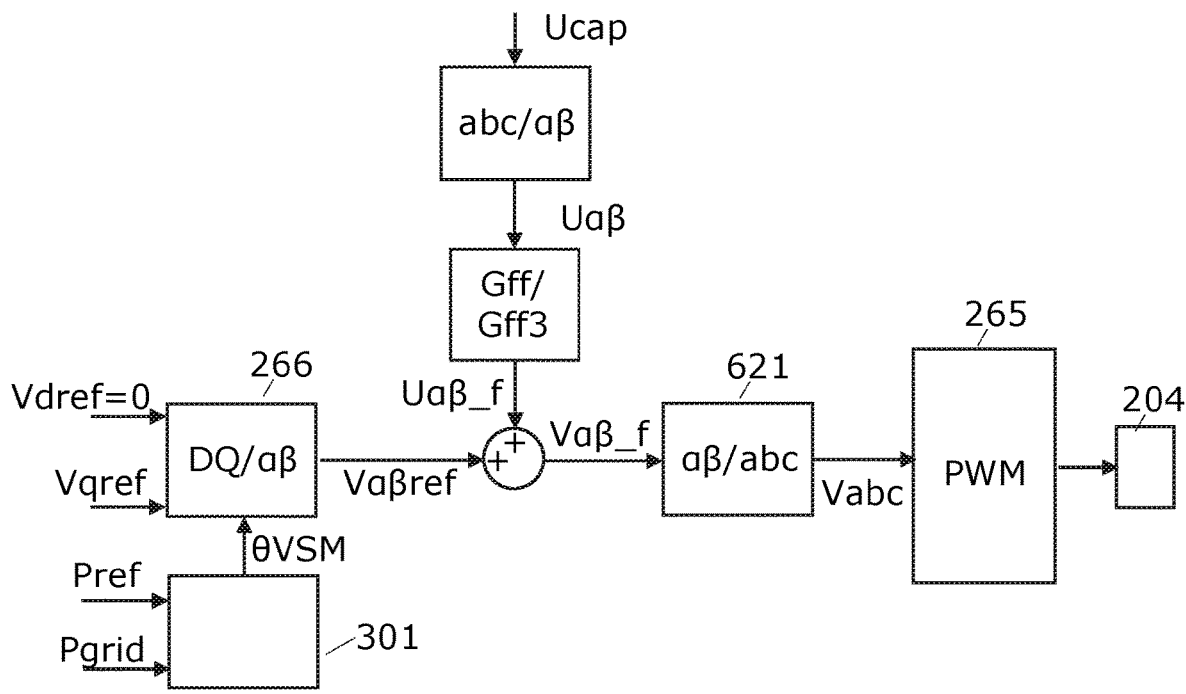

FIG. 6B shows an alternative example of the implementation of the compensation filter GM The solution in FIG. 6B is equivalent with the solution in FIG. 6A but based on other frame transformations.

In this example, the voltages Ucap are transformed from the measurement frame to the stationary αβ frame. The abc/αβ transformation transforms the three vector values in the measurement frame abc to two vector values in the αβ frame. The transformed capacitor voltage signals Ucap are referred to as transformed capacitor voltage signals Uαβ.

Vαβref is the DQ transformed version of Vdqref, where Vdqref is the voltage reference Vdqref in the DQ frame generated based on the voltage magnitude reference Vqref (not explicitly shown in FIG. 6A).

The virtual synchronous machine angle θVSM is used for the frame conversion unit 266 from the DQ frame into the αβ frame and transformed by transform element 621 to the measurement frame abc and provided as a control signal to the pulse-width-modulator PWM.

The transformed capacitor voltage signals Uαβ are filtered with the compensation filter Gff into filtered capacitor voltage signals Uαβ_f so as to reduce an amplitude of the impedance peak 511 and/or shift the impedance peak 511.

Since the transformed capacitor voltage signals Uαβ are represented as time-varying signals, a notch filter Gff3 is arranged in series with the compensation filter Gff or the notch filter is included in the compensation filter Gff to decouple the voltage reference yap from the filtered capacitor voltage signals Uαβ_f at the fundamental frequency, e.g. the 50 Hz grid frequency. Thus, the notch filter is arranged to select frequency components of the filtered capacitor voltage signals Uαβ_f around the fundamental frequency.

The filtered capacitor voltage signals Uαβ_f are combined, e.g. added, with the transformed voltage reference Vαβref to generate the filter compensated voltage reference Vαβ_f.

The filter compensated voltage reference Vαβ_f is transformed from the αβ frame to the measurement frame abc similarly to the control signal derived from the synchronous machine angle θVSM. Thus, two signals are transformed by the αβ/abc transform element 621.

The filtering circuits of FIG. 6A-B or other similar filter circuits may be implemented in the control system 250.

Figure 5:
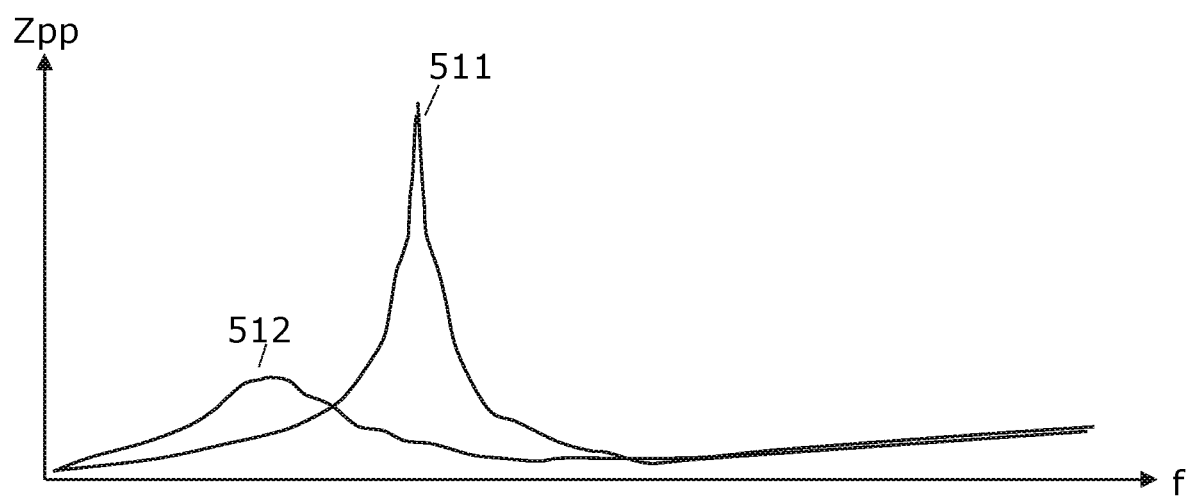
FIG. 5 shows graphs which shows that the impedance peak been transformed to an acceptable frequency range and/or peak magnitude.

FIG. 5 shows graphs of impedance characteristics Zpp as a function of frequency f. The graphs show results of applying the solutions in FIG. 6A-B. Thus, FIG. 5 shows that the impedance peak 511 of an impedance graph obtained from a virtual synchronous machine implemented without a compensation filter Gff has been transformed to the impedance peak 512 of the a graph obtained when the compensation filter is implemented. The later graph shows that the impedance peak is reduced in magnitude and shifted to a lower frequency, i.e. from a frequency or frequency range where the peak is not acceptable to a frequency or frequency range where the reduced peak may be acceptable.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc, should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a power generating unit, the power generating unit comprises a power source, a machine side converter, a line side converter, a DC link electrically connected to an output of the machine side converter and an input of a grid side converter, and filter inductors and filter capacitors arranged at the output of the power generating unit, the method comprising:
   obtaining capacitor voltage signals in a measurement frame by measuring capacitor voltages of one or more of the filter capacitors;
   determining a virtual synchronous machine rotational speed based on a combination of a feedback of a damping power, a power reference, a grid power and an inertial integration model and a synchronous machine angle based on an integration of the synchronous machine rotational speed, where a derivative of the synchronous machine rotational speed is indicative of a deviation between a power reference for a desired power output of the power generating unit and a grid power supplied by the power generating unit to the output combined with the damping power, and wherein the damping power is determined based on the virtual synchronous machine rotational speed;
   providing a voltage magnitude reference for a desired reactive power to be generated by the line side converter;
   transforming the capacitor voltage signals from the measurement frame into a target frame to generate transformed capacitor voltage signals;
   filtering the capacitor voltage signals, or the transformed capacitor voltage signals, with a compensation filter into filtered capacitor voltage signals, where the compensation filter is designed to reduce a magnitude of an impedance peak and/or shift the impedance peak, where the impedance peak is present in an impedance characteristic of the output of the power generating unit; and
   determining a filter compensated voltage reference by combining the voltage magnitude reference, or a frame transformation of the voltage magnitude reference, with the filtered capacitor voltage signals.

2. The method of claim 1, comprising controlling power output from the power generating unit by:
controlling a generation of reactive power generation from the line side converter based on the filter compensated voltage reference, or a frame transformation of the filter compensated voltage reference; and
controlling the generation of active power generation from the line side converter based on the synchronous machine angle, or a transformation thereof.

3. The method of claim 1, where the compensation filter or a series connected filter further comprises a high pass filter to decouple the voltage magnitude reference from the filtered capacitor voltage signals at a fundamental frequency.

4. The method of claim 1, where the determination of the damping power based on the virtual synchronous machine rotational speed comprises high-pass filtering the synchronous machine rotational speed and determining the damping power based on the high-pass filtered signal.

5. The method of claim 1, comprising:
obtaining a network voltage at a connection point of the output of the power generating unit;
determining a rotational speed of a virtual synchronous machine of the grid based on the network voltage; and
determining the damping power based on the virtual synchronous machine rotational speed and the rotational speed of the grid.

6. The method of claim 1, wherein the compensation filter comprises a lead-lag filter or a high-pass filter.

7. The method of claim 1, wherein the filter compensated voltage reference is determined by combining the voltage magnitude reference or a derived voltage reference with the filtered capacitor voltage signals.

8. The method of claim 1, wherein the capacitor voltage signals are transformed from the measurement frame into the target frame to generate the transformed capacitor voltage signals.

9. The method of claim 1, further comprising transforming the filter compensated voltage reference from the target frame to the measurement frame.

10. The method of claim 1, wherein the power generating unit is a wind turbine.

11. A control system for controlling a power generating unit, the power generating unit comprises a power source, a machine side converter, a line side converter, a DC link electrically connected to an output of the machine side converter and an input of a grid side converter, and filter inductors and filter capacitors arranged at the output of the power generating unit, the control system is arranged to perform an operation, comprising:
obtaining capacitor voltage signals in a measurement frame by measuring capacitor voltages of one or more of the filter capacitors;
determining a virtual synchronous machine rotational speed and/or a synchronous machine angle, where a derivative of the synchronous machine rotational speed is indicative of a deviation between a power reference for a desired power output of the power generating unit and a grid power supplied by the power generating unit to the output combined with a damping power;
providing a voltage magnitude reference in direct quadrature (DQ) frame for a desired reactive power to be generated by the line side converter;
transforming the capacitor voltage signals from the measurement frame into a target frame to generate transformed capacitor voltage signals;
filtering the capacitor voltage signals, or the transformed capacitor voltage signals, with a compensation filter into filtered capacitor voltage signals, where the compensation filter is designed to reduce a magnitude of an impedance peak and/or shift the impedance peak, where the impedance peak is present in an impedance characteristic of the output of the power generating unit;
transforming the voltage magnitude reference in the DQ frame to a non-rotating target frame; and
determining a filter compensated voltage reference by combining the transformed voltage magnitude reference with the filtered capacitor voltage signals.

12. The control system of claim 11, comprising controlling power output from the power generating unit by:
controlling a generation of reactive power generation from the line side converter based on the filter compensated voltage reference, or a frame transformation of the filter compensated voltage reference; and
controlling the generation of active power generation from the line side converter based on the synchronous machine angle, or a transformation thereof.

13. The control system of claim 11, where the compensation filter or a series connected filter comprises a high pass filter to decouple the voltage magnitude reference from the filtered capacitor voltage signals at a fundamental frequency.

14. A system, comprising:
a wind turbine, comprising:
a tower;
a nacelle;
a generator disposed on the nacelle; and
a rotor extending from the generator and having a plurality of blades disposed on a distal end thereof;
a power generating unit, comprising:
the generator;
a machine side converter;
a line side converter;
a DC link electrically connected to an output of the machine side converter and an input of a grid side converter;
a plurality of filter inductors and filter capacitors arranged at an output of the generator; and
a control system for controlling the power generating unit according to an operation, comprising:
obtaining first capacitor voltage signals in a first measurement frame by measuring capacitor voltages of one or more of the filter capacitors;
determining a virtual synchronous machine rotational speed and/or a synchronous machine angle, where a derivative of the synchronous machine rotational speed is indicative of a deviation between a power reference for a desired power output of the power generating unit and a grid power supplied by the power generating unit to the output combined with a damping power;
providing a voltage magnitude reference for a desired reactive power to be generated by the line side converter;
filtering the first capacitor voltage signals with a compensation filter into filtered capacitor voltage signals, where the compensation filter is designed to reduce a magnitude of an impedance peak and/or shift the impedance peak, where the impedance peak is present in an impedance characteristic of the output of the power generating unit;
determining a first filter compensated voltage reference by combining the voltage magnitude reference, or a frame transformation of the voltage magnitude reference, with the first filtered capacitor voltage signals; and determining a second filter compensated voltage reference by combining the voltage magnitude reference, or the frame transformation of the voltage magnitude reference, with second filtered capacitor voltage signals.

15. The system of claim 14, further comprising:

obtaining second capacitor voltage signals in a second measurement frame by measuring capacitor voltages of one or more of the filter capacitors;

transforming the second capacitor voltage signals from the second measurement frame into a target frame to generate transformed capacitor voltage signals; and filtering the transformed capacitor voltage signals, with the compensation filter into the second filtered capacitor voltage signals, where the compensation filter is designed to reduce a magnitude of an impedance peak and/or shift the impedance peak, where the impedance peak is present in an impedance characteristic of the output of the power generating unit.

16. The system of claim 14, further comprising controlling power output from the power generating unit by:

controlling a generation of reactive power generation from the line side converter based on the filter compensated voltage reference, or a frame transformation of the filter compensated voltage reference; and controlling the generation of active power generation from the line side converter based on the synchronous machine angle, or a transformation thereof.

* * * * *